Jan. 11, 1927.
E. R. ARMSTRONG
1,613,598
TRACTION APPLIANCE FOR AUTOMOBILES
Filed April 17, 1925
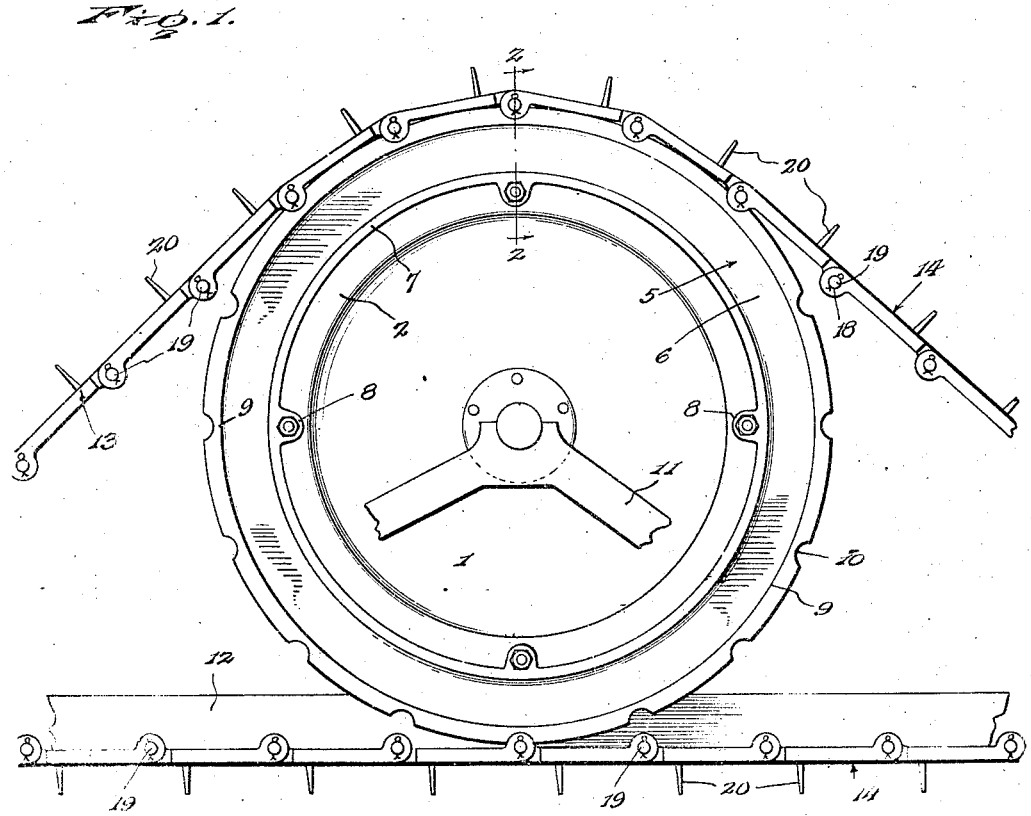
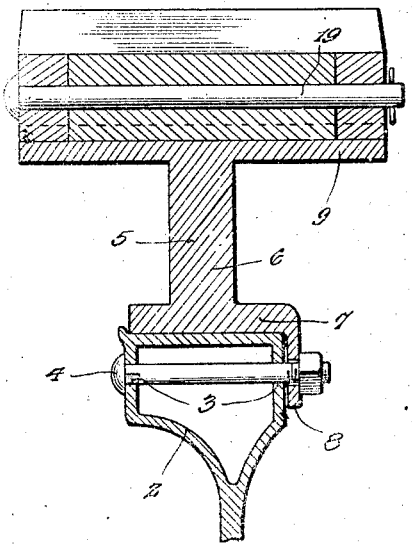
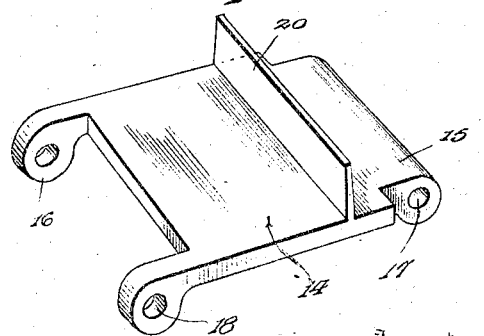
Inventor
E. R. Armstrong.
By　　　　　　, Attorney Patented Jan. 11, 1927.

1,613,598

UNITED STATES PATENT OFFICE.

EDWARD R. ARMSTRONG, OF HOLLAND, MICHIGAN.

TRACTION APPLIANCE FOR AUTOMOBILES.

Application filed April 17, 1925. Serial No. 23,955.

This invention relates to sled attachments for automobiles and more particularly to that type which are designed to be mounted upon the wheels of an automobile and particularly the driving wheels, and permit of the automobile being driven over snow or ice covered roads with substantially the same facility as it may be driven over roads in normal condition. The present application is an improvement over my co-pending application for patent for sled attachment for automobiles filed August 8, 1924, Serial No. 730,896. In the said co-pending application, a saddle member is applied to the rear or drive wheels of the automobile and a rim is applied to the said wheel and has sprockets which coact with the links of a sprocket chain to cause travel of the chain over the rim and over sprocket gears which are rotatably mounted upon the saddle member, the links of the chain being provided with spurs. However, this construction presents disadvantages which the present invention has as its object to overcome and one of the objects of the present invention is to provide a novel form of rim attachment which is to be substituted for the tire rim of the whel and likewise provide a novel construction of sprocket chain to mesh with the said rim in a manner to better insure of a steady transmission of power to the chain.

Another object of the invention is to so construct the links of the chain that they will possess greater strength than in the instance of the co-pending application and will not be liable to slip or become distorted.

In the acompanying drawings:

Figure 1 is a view in side elevation illustrating so much of the mechanism embodying the present invention as is necessary to an understanding thereof.

Figure 2 is a detail vertical transverse sectional view taken substantially on the line 2—2 of Figure 1, Figure 3 is a perspective view of one of the chain links.

In the drawings, the numeral 1 indicates one of the rear or drive wheels of an automobile having the usual felly 2 upon which is ordinarily mounted the tire supporting rim, the said felly 2 having transversely alined openings 3 therein for the passage of bolts 4 which ordinarily secure the tire supporting rim in place upon the felly.

The invention contemplates the provision, as a substitute for the tire supporting rim, of a rim which constitutes in effect, a large sprocket gear, and this rim is indicated in general by the numeral 5 and comprises an annular web 6, an annular body 7 which is designed to fit upon the felly 2, and apertured lugs 8 through which the bolts 4 are designed to be secured when the substitution is made. The annular web 6 supports an integral circumferential rim portion 9 which, at intervals in its circumference is formed in its outer surface with a plurality of transversely extending recesses 10. In this respect, as will presently be made apparent, the structure differs from that disclosed in my co-pending application in which the rim is formed with sprocket teeth.

The numeral 11 indicates in general a saddle structure which supports the hub of the wheel and which includes runner members 12 which extend longitudinally at opposite sides of the lower side of the wheel and its rim and at the ends of which are mounted sprocket gears (not shown) which correspond in general formation to the rim 5 just described.

The numeral 13 indicates in general the traction chain embodying the invention and this chain is made up of a series of links, one of which is clearly illustrated in Figure 3 of the drawings and indicated in general by the numeral 14. The link 14 comprises a substantially flat body which is formed at one end with a transversely extending approximately cylindrical pintle lug 15, the under side of which projects below the plane of the under side of the link and this lug is of a length slightly less than the width of the body of the link. The link is formed at its opposite end with spaced pintle ears 16, and the pintle lug 15 and pintle ears 16 are formed respectively with openings 17 and 18. The pintle lugs or ears 16 likewise project below the under side of the body of the link and the ears of one link straddle the ends of the pintle lug 15 of the other link, and pintle pins 19 are fitted through the registering openings in the lugs 15 and ears 16 and serve to pivotally connect the links of the chain, it being evident by reference to Figures 1 and 2 of the drawings that the inwardly presented sides of the pintle lugs 15 and ears 16 engage in the transverse recesses 10 so that a driving connection is established between the rim 5 and the links of the chain.

In this manner, a more steady and positive drive is obtained and the structure is rendered more durable and substantial, and there is no likelihood of the driving lugs being broken of as is the case where rim is provided with sprocket teeth.

In the present invention, gripping lugs 20 are formed integrally upon the outer side of body portions of the links 14 and extend transversely thereof, and these lugs are preferably located near the pintle lugs 15.

The advantage which the present construction presents over the structure of my co-pending application is that the links are more substantial and, due to the fact that their transverse pintle portions 15 and 16 engage in the recesses 10 in the rim member 9, a more secure and positive drive is obtained than by the use of a sprocket gear and a sprocket chain. Furthermore, in the structure of the co-pending application, considerable stress was imposed on the teeth of the rim attachment, whereas in the present case, this is not true and the strain is borne solely by the lugs 20 which are of substantial construction and integral with the links 14.

It will be understood, of course, that the saddle member 11 and the side members 12 constitute a runner which is designed to travel over the snow-covered roads, precisely as in the co-pending application.

Having thus described the invention, what I claim is:

A rim attachment for a wheel, comprising spaced concentric annular members, an integral annular web connecting the said members midway between their edges, and apertured ears extended inwardly from an edge of the inner annular member, the outer annular member having equidistantly spaced transverse recesses in its outer side.

In testimony whereof I affix my signature.

EDWARD R. ARMSTRONG. [L. S.]